United States Patent [19]

Masclet

[11] 4,026,502
[45] May 31, 1977

[54] SKI DEVICES FOR MOUNTING ON LANDING GEAR HAVING WHEELS DISPOSED IN TANDEM

[75] Inventor: Jean Masclet, Paris, France

[73] Assignee: Messier Hispano, Montrough, France

[22] Filed: Jan. 22, 1976

[21] Appl. No.: 651,545

[30] Foreign Application Priority Data

Jan. 28, 1975 France .............................. 75.02490

[52] U.S. Cl. .............................. 244/108; 244/105
[51] Int. Cl.² .......................................... B64C 25/52
[58] Field of Search ............ 244/108, 101, 102 SL, 244/102 R, 105; 280/7.12, 8-11; 267/65 R

[56] References Cited

UNITED STATES PATENTS

| 1,581,415 | 4/1926 | Adamczik | 244/108 |
| 1,602,536 | 10/1926 | McElroy | 267/65 R |
| 2,591,839 | 4/1952 | Levy | 244/102 SL |
| 2,733,026 | 1/1956 | Ditter | 244/108 |
| 2,925,970 | 2/1960 | Heaslip | 244/108 |
| 3,218,006 | 11/1965 | Albright | 280/9 |

FOREIGN PATENTS OR APPLICATIONS

| 1,207,959 | 2/1960 | France | 244/108 |
| 496,867 | 1/1929 | Germany | 280/11 |
| 780,413 | 7/1957 | United Kingdom | 244/108 |

Primary Examiner—Trygve M. Blix
Assistant Examiner—Galen L. Barefoot
Attorney, Agent, or Firm—J. Harold Nissen

[57] ABSTRACT

A ski device adapted to be mounted on a landing gear provided with front and rear sheets each of which carry a wheel with the wheels being positioned in tandem. The device includes a monobloc ski assembly having an aperture therethrough through which the wheels move to raise and lower the skis off the ground and provide for ease of manoeuverability on a runway and a snow covered terrain.

9 Claims, 7 Drawing Figures

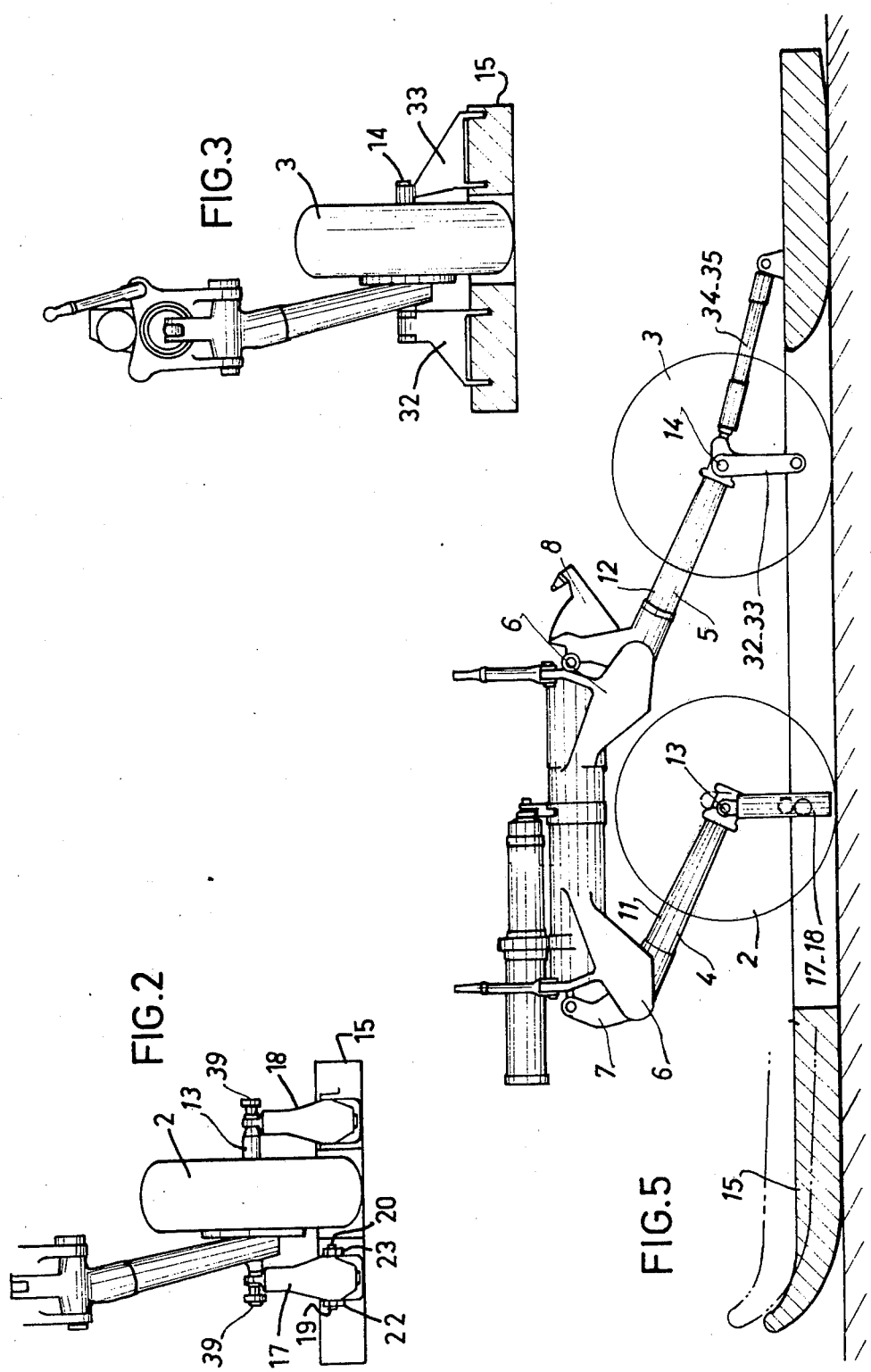

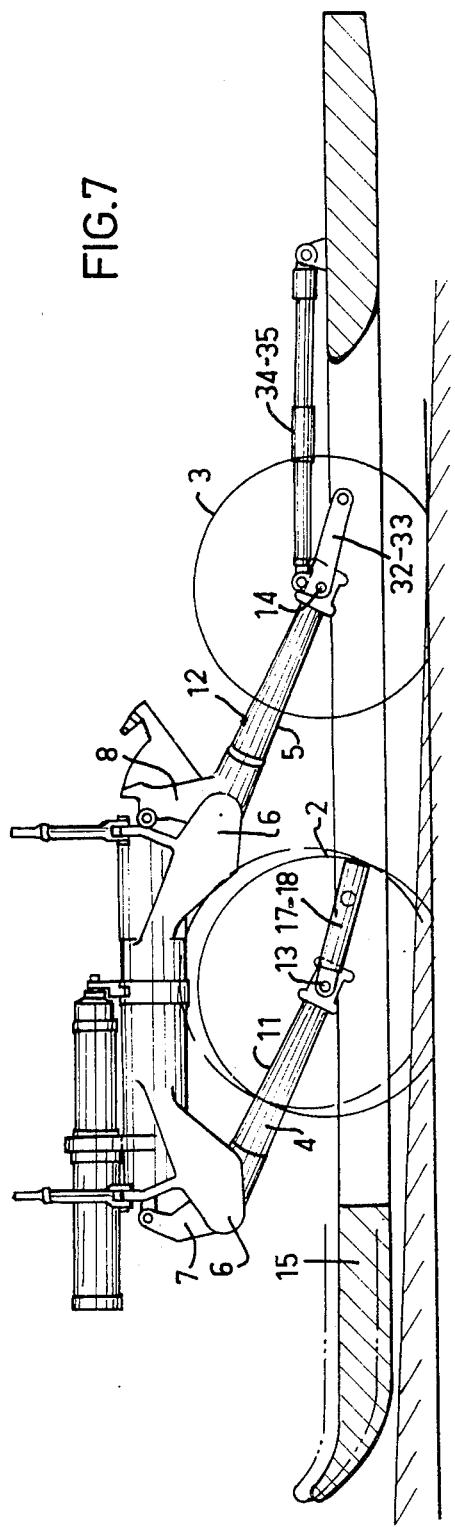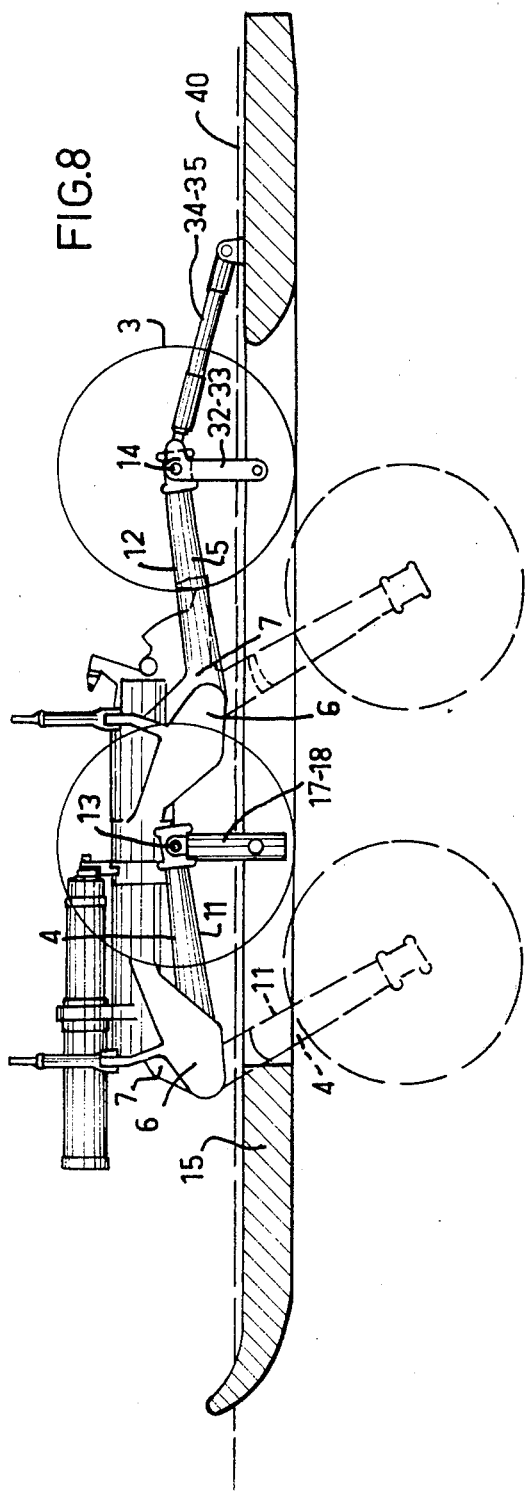

SKI DEVICES FOR MOUNTING ON LANDING GEAR HAVING WHEELS DISPOSED IN TANDEM

The present invention relates to a ski device for mountng on landing gear having wheels disposed in tandem and strutted joints.

More particularly, it relates to an assembly of devices adapted to convert a landing gear having two struts for example of the type described in French Pat. No. 1,207,959 in the name of the Applicants, and allowing an aircraft to maneuver both on a runway and on snow-covered terrain, while at the same time maintaining the possibility of retracting the wheels and even all or part of the ski mechanism.

Such a landing gear having wheels disposed in tandem may conventionally comprise on the one hand two identical elbowed levers the arms of which are orientated parallel, placed one behind the other and mounted to oscillate about two axes at right-angles to the plane of symmetry of the aircraft and rigid with the structure of this latter, the lower end of each of the lever arms carrying an axle on which a wheel or a pair of wheels is or are pivotally mounted, and furthermore a shock absorber rigid with the structure of the aircraft and of which the movable elements are connected to the said levers by connecting rods.

Consequently, the ski device according to the invention essentially comprises, for each of the abovementioned landing gear having tandem wheels, a monobloc ski unit in which there is an aperture through which the said wheels can pass, and also two mechanical connections which respectively provide for attachment of the ski to the two struts of the landing gears, in other words a first mechanical connection consisting of elastic means articulated on the one hand on the front strut and on the other on the ski, in order to withstand the lateral loadings exerted on the ski and to transmit them to the said front strut, these elastic means being capable of extending axially when they are subjected to traction, and then, when at rest, to resume their initial length and then transmit vertical stresses, and a second triangulated mechanical link comprising at least one rigid connecting member articulated on the one hand on the rear strut and on the other on the ski, in order to withstand the lateral and vertical loadings exerted on the ski, and in order to transmit them to the said rear strut, and at least one jacket, for example a hydraulic jack, articulated on the said connecting member and on the ski, at a position located to the rear of the said connecting member, the said jack making it possible, by virtue of the bias of the two aforesaid connections, on the one hand to take up again the longitudinal stresses and on the other to dispose the ski in a lowered or raised position with respect to the wheels and to maintain it in one or other of these two positions.

According to another feature of the invention, the ski device comprises a roller or the like rigid with the front strut of the landing gear, which abuts, with a possiblity of sliding or rolling on the said ski when this latter is in a raised position with respect to the wheels.

One form of embodiment of the invention will be described hereinafter by way of non-limitative example, with reference to the appended drawings, in which:

FIGS. 2 and 3 show in cross-section the mechanical links between the ski and the front struts (FIG. 2) and the rear strut (FIG. 3) of the landing gear;

FIGS. 5, 6, 7 and 8 show the landing gear illustrated in FIG. 1, respectively:
  in a skiing position (FIG. 5)
  in a configuration for landing on a runway, in the raised and flight-line positions (FIG. 6)
  in the position for runway use (FIG. 7)
  in the retracted position of the assembly (FIG. 8).

Figure 1:
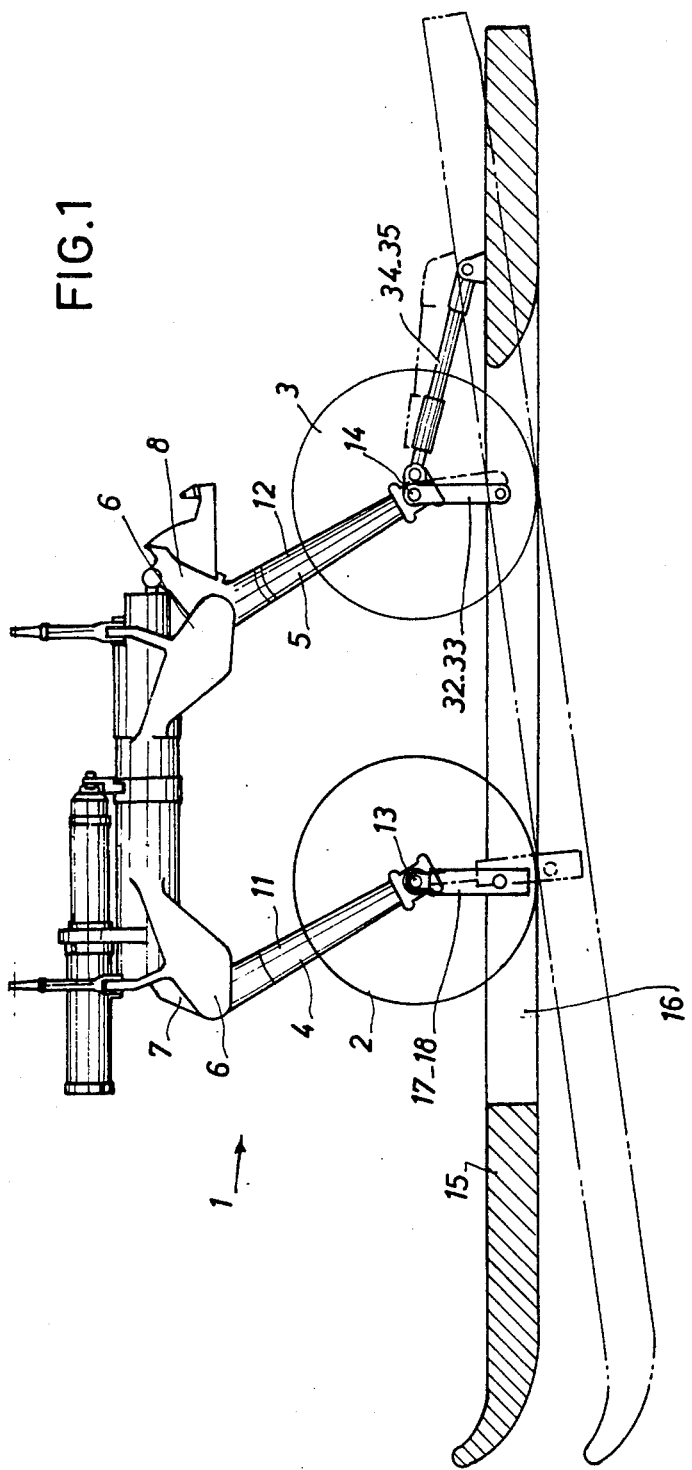
FIG. 1 is a view of a landing gear having wheels disposed in tandem, in the configuration for a ski landing.

With reference to FIG. 1, the landing gear 1 having wheels 2, 3 disposed in tandem is composed in conventional manner of a front strut 4 and a rear strut 5 articulated on the one hand on a structure 6 rigid with the aircraft and on the other, at the end of their upper arms 7, 8 on a shock absorber and supension device. The ends of the lower arms 11, 12 of the struts 4, 5 each carry an axle 13, 14 on which the wheels 2 and 3 are pivotally mounted. In this respect, it will be noted that one of the characteristic features of such a landing gear resides in the fact that when the front wheel 2 is pushed in, for example when it passes over a bump, the distance between centres of the two wheels 2, 3 diminishes while the pushing-in of the rear wheel 3 causes an increase in this distance between centres.

According to the invention, this landing gear 1 comprises a monobloc ski unit 15 consisting of a box structure in which there is an aperture 16 adequate to allow passage of the two wheels 2, 3 in all positions. The ski 15 is fixed to the front strut 4 by means of two elastic assemblies 17, 18 situated on either side of the wheel 2 (FIG. 2) and articulated on the one hand on the said ski 15 and on the other on a lateral extension of the axle 13 of the wheel 2. Each of the elastic assemblies 17, 18, articulation on the ski is effected by means of two transverse journals 19 and 20 situated one on either side of the elastic assembly, which are engaged in bearings 22, 23 rigid with the structure of the ski.

Figure 4:
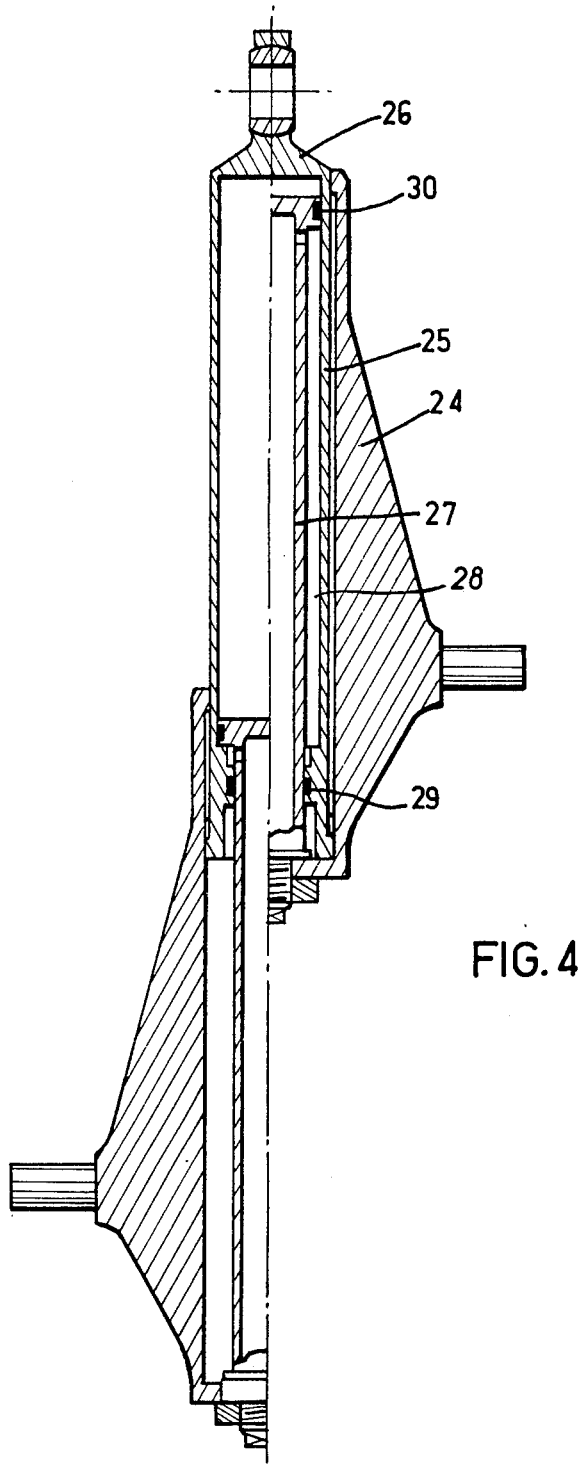
FIG. 4 shows, partially in axial section, a possible form of embodiment of the elastic means associated with the front strut.

As shown in FIG. 4, the elastic assembly 17 or 18 is essentially constituted by a body 24 having a cylindrical bore in which slides a tubular rod 25, the upper closed end 26 of which is mounted to pivot on the axle 13 of the wheel 2. Coaxially disposed inside this tubular rod 25 is a second cylindrical rod 27 rigid with the body 24, defining with the inner surface of the tubular rod 25 an annular lateral chamber 28 closed by means of a segment or seals 29, 30 disposed in the bottom part of the rod 25 and in the upper part of the rod 27, and into which a pressurised gas is introduced.

This assembly therefore behaves like a traction spring and it is capable of extending, by the tubular rod 25 sliding within the body 24, when it is urged to do so, and can resume its initial length under the traction of the air pressure inside the chamber 28. Of course, it will be possible to utilise the elasticity of the normal mechanical spring instead of that of the compressed air, if space should permit.

It should be noted in this respect that this device, by reason of its conception (rugged connection between the body 24 and the rod 25) is capable of withstanding lateral loadings introduced on the ski 15 and which are applied to the journals 19 and 20 and can transmit them to the front strut 4 of the landing gear 1.

In the example shown in FIG. 4, the flexible assembly 17 or 18 is shown in the retracted position at rightangles to its longitudinal axis, and in a position opened out to the left of its longitudinal axis.

The ski 15 is attached to the rear part of the undercarriage by two panels 32, 33 (FIG. 3) situated one on either side of the wheel 3, mounted to pivot on the axle 14 of the rear wheel 3 and articulated on the ski 15.

This connection is completed by two hydraulic jacks 34, 35 articulated on each of the panels 32, 33 and on the ski 15, to the rear of the panels 32, 33 in order to constitute a triangulation.

Figure 6:
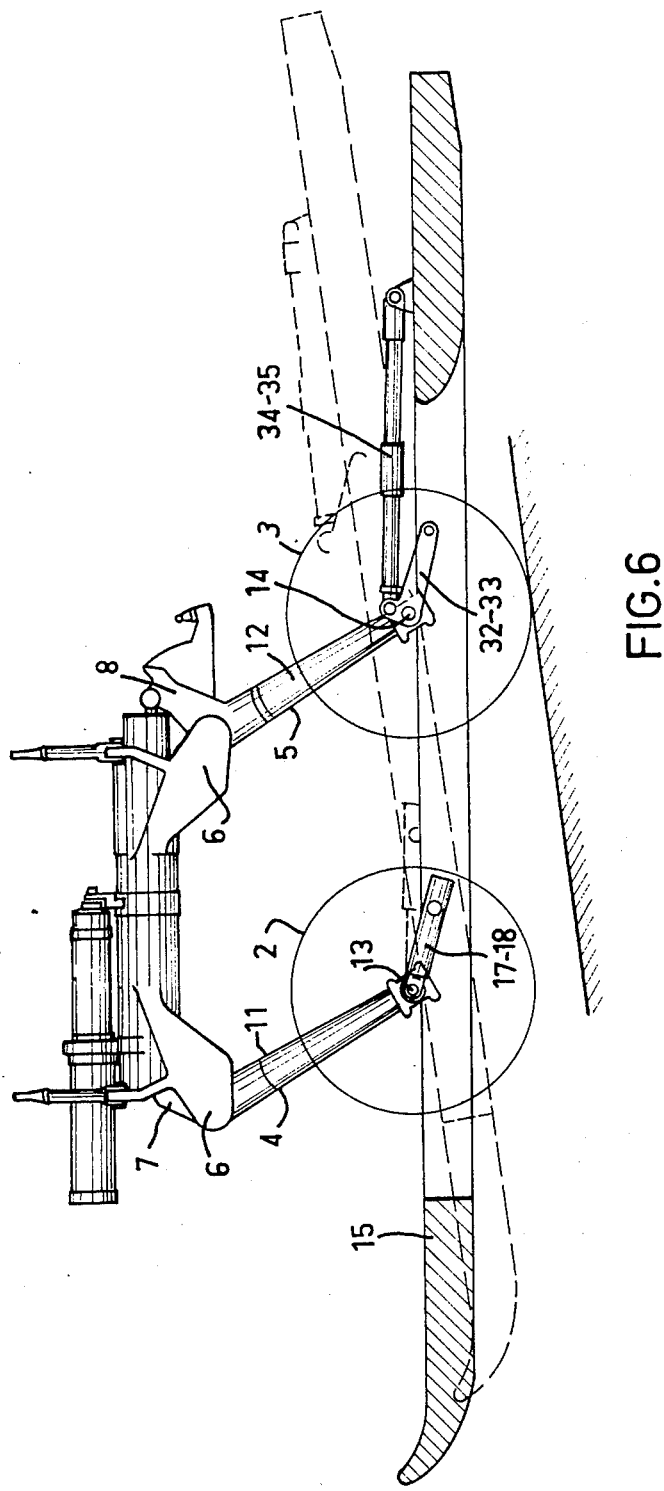

Thus, when the jacks 34, 35 are compressed and locked, the ski 15 is in the low position with respect to the wheels 2 and 3 (FIGS. 1 and 5), on the other hand, when these jacks 34, 35 are extended, the ski 15 is raised (FIGS. 6 and 7).

Thus, the manner of attachment of the ski 15 on the front and rear struts 4 and 5 means that the ski 15, upon impact, and when the aircraft is in a tail-down position, pivots about the axle 14 (from the position shown in solid lines to the position shown in broken lines), by virtue of the possibilty of extending the elastic assemblies 17, 18. This possibility avoids abnormal stresses on the ski 15 and allows it to assume the best position for landing.

It will be noted that in order to avoid the rear of the ski scraping on the snow-covered runway at the moment of impact and in order to allow the latter to slide, the underside of the ski 15 is slightly raised at the rear.

FIG. 5 shows the whole of the landing gear 1 equipped with the ski 15, after landing, in the skiing position.

The elastic assemblies 17-18 have resumed their compressed position, so transmitting the vertical stresses, and the supension of the aircraft is ensured by the double strut undercarriage 4, 5 which as previously mentioned comprises a suspension and a shock absorption device.

In the position illustrated in this drawing, each of the struts 4, 5 of the undercarriage can move independenlty of the other, allowing the ski 15 to follow undulations of the ground, particularly by reason of the opportunities for angular movement of the elastic elements 17, 18.

FIG. 6 shows the whole of the landing gear with its ski apparatus in a position suitable for landing on a runway or on hard ground. By the action of the jacks 34, 35 which have been brought into the extended condition, the ski 15 is raised with respect to the wheels 2, 3. Movement of the ski 15 is then limited by abutments 39 rigid with the front strut 4 of the landing gear 1. In the example shown in FIG. 2, these abutments 39 are provided by rollers mounted at the end of the axle 13 of the wheel 2.

By way of indication, FIG. 6 shows the position which might be assumed by the ski during the course of a tail-down impact, on the rear undercarriage assembly, in order to show that there could be no opportunity of interference between the ski and the ground.

Thus, the solid-line illustration of the ski corresponds to the position for landing on a runway, when the aircraft is in its flying line, whereas the broken-line illustration shows the successive phase of landing in which the rear assembly is pushed in.

FIG. 7 shows the whole of the landing gear in a suitable configuration for landing on a runway (or hard ground), after impact. This drawing best shows the behaviour of the landing gear in the taxiing position, under a static loading, the front wheels and rear wheels passing over bumps.

In the event of a bump passing under the front wheel 2, the rollers 39 as previously mentioned bear on the ski 15 and the elastic elements 17, 18 are therefore slightly extended.

By reason of the upwards displacement of the front wheel 2, the distance between the axles 13, 14 of the front wheel 2 and of the rear wheel 3 diminishes. The elastic elements 17, 18 absorb this reduction in length by reason of the aforesaid initial tension. This reduction is slight by reason of the almost perfect configuration of alignment between the elastic elements 17, 18 and the strut 4.

In the event of the rear wheel 3 passing over a bump, the distance between the wheels 2 and 3 increases and the rollers 39 remain abutting on the ski while the elastic elements 17, 18 extend.

In either case, there is an obvious reduction in the contact of the ski with the ground by virtue of the slight rocking action. Consequently, the dimensions and the proportions of the means of connecting the ski 15 to the struts 4 and 5 are determine as a function of the envisaged height of the bumps to be negotiated, and this, having regard to their kinetics, in such a way that contact of the ski 15 with the ground does not fall below a minimum level.

FIG. 8 shows the whole of the landing gear after it is raised into the aircraft. In this respect, it will be noted that the original undercarriage has its own possibilities of retraction and simply carries the ski 15 which, with respect to the outer profile of the fuselage (interrupted line 40), occupies the required position.

For reasons of simplicity, FIG. 8 shows the ski 15 which is not completely retracted into the fuselage, which offers no problem in view of its length and the relatively modest performances of the aircraft which can benefit from such arrangements. It is obvious that if the forms of aircraft are complicated, it would be possible completely to retract the undercarriage and ski arrangement.

It will be noted finally that the position shown in broken lines, of the wheels 2 and 3 and of the struts 3 and 4 is the position prior to retraction.

I claim:

1. A ski device adapted to be mounted on a landing gear provided with front and rear struts each arranged to carry a wheel, the wheels being positioned in tandem, comprising a monobloc ski assembly having an aperture therethrough through which the wheels pass, a first mechanical connection including elastic means having one end articulated to the ski and the other end articulated to the front strut, a second mechanical connection including a rigid member and an hydraulic jack means, said rigid member having one end articulated to the ski and the other end articulated to the rear strut, said hydraulic jack having one end articulated to said rigid connecting member and its other end articulated to the ski, said elastic means being adapted for withstanding lateral loadings exerted on the ski and to transmit them to said front strut and being adapted for axial extension when subjected to a traction loading and when at rest resuming their initial length allowing for the transmission of vertical stresses; said rigid connecting member and said hydraulic jack means forming a triangulated mechanical connection, said jack means being effective to take up the longitudinal stresses and to position the ski in its lowered and raised position with respect to the wheels and to maintaining it in all of the aforesaid positions.

2. The ski device as claimed in claim 1, including at least one roller carried by said front strut adapted for abutment and rolling on the ski in the raised position thereof.

3. The ski device as claimed in claim 1, said elastic means includes a body portion connecting to the ski and a slidable member having one end adapted to slide within said body and having its other end connected with said strut.

4. The ski device as claimed in claim 3, said elastic means including a member in said body portion rigid therewith and forming with said slidable member an annular lateral closed chamber to assure maintenance of said elastic means in alignment with said front strut in the raised position of the ski.

5. The ski device as claimed in claim 1, said elastic means including a pair of elastic elements, an axle carried by said front strut, the front wheel being carried by said axle, and one of said elastic elements being positioned on each side of the wheel.

6. The ski device as claimed in claim 1, said rigid connecting member including a pair of panels, an axle carried by said rear strut, the rear wheel being carried by said axle, and each of said panels having one end pivotally connected with the rear wheel, one on each side of the rear wheel.

7. The ski device as claimed in claim 1, including an axle on each said strut for axially connecting the front and rear wheels, said elastic means including a pair of elastic elements, one positioned on each side of the front wheel, said elastic element comprising a body having a cylindrical bore, a first cylindrical member slidable in said bore, a second cylindrical member rigid with said body diposed within said first cylindrical member, means sealingly joining said first and second cylindrical members to define an annular lateral chamber, a pressurized gas in said chamber, the upper end of said first cylindrical member being pivotally connected with the axle on said first strut and means connecting the ski with said body, and said hydraulic jack means including a pair of hydraulic jacks each positioned on opposite sides of the rear wheel and having one end pivotally connected with said axle connected to said rear strut and having its other end connected with the ski.

8. The ski device as claimed in claim 1, where the ski is of a box-like structure.

9. The ski device as claimed in claim 1, wherein the sliding surface of the ski has a slightly raised rear part.

* * * * *